US009849524B2

(12) United States Patent
Lawlor et al.

(10) Patent No.: US 9,849,524 B2
(45) Date of Patent: Dec. 26, 2017

(54) TOOL WITH LINEAR DRIVE MECHANISM (71) Applicant: Creative Motion Control, Inc., Redmond, WA (US)

(72) Inventors: Shawn Lawlor, Redmond, WA (US); Charles Cornelius, Kirkland, WA (US)

(*) Notice: Subject to any disclaimer, the term of this patent is extended or adjusted under 35 U.S.C. 154(b) by 0 days.

(21) Appl. No.: 14/777,272

(22) PCT Filed: Mar. 17, 2014

(86) PCT No.: PCT/US2014/030843
§ 371 (c)(1),
(2) Date: Sep. 15, 2015

(87) PCT Pub. No.: WO2014/145980
PCT Pub. Date: Sep. 18, 2014

(65) Prior Publication Data
US 2016/0039017 A1 Feb. 11, 2016

Related U.S. Application Data (60) Provisional application No. 61/788,515, filed on Mar. 15, 2013.

(51) Int. Cl.
*F16H 25/22* (2006.01)
*B23D 29/00* (2006.01)
(Continued)

(52) U.S. Cl.
CPC ............ *B23D 17/04* (2013.01); *B23D 29/00* (2013.01); *B26B 15/00* (2013.01); *F16H 25/2252* (2013.01)

(58) Field of Classification Search
CPC ..... F16H 25/2252; B23D 29/00; B23D 17/04; B26B 15/00
See application file for complete search history.

(56) References Cited

U.S. PATENT DOCUMENTS 2,683,379 A * 7/1954 Strandgren ......... F16H 25/2252
74/424.92
4,896,862 A 1/1990 Ganley
(Continued)

FOREIGN PATENT DOCUMENTS

DE 19823154 C1 11/1999
WO WO 2013/011230 A1 * 1/2013
WO WO 2016/077389 A1 * 5/2016

*Primary Examiner* — Hwei C Payer
(74) *Attorney, Agent, or Firm* — Dean A Craine; Marisa C Whitaker (57) ABSTRACT

A hand tool with a mechanical linear drive mechanism coupled to a linear activated working implement. The drive mechanism includes a geared planetary roller screw that includes a torque tube connected to a roller screw's nut body. The planetary roller screw includes a fixed outer race, a rotating set of grooved rollers axially aligned inside the outer race, a cylindrical nut body located inside the set of grooved roller, a plurality of inner rollers axially aligned and inside the nut body, a threaded shaft axially aligned and inside the inner rollers, and a torque tube axially aligned inside the inner rollers. The torque tube is connected at one end to a gear box which is coupled to an electric motor. When the electric motor is activated, the torque tube is rotated which causes a threaded shaft in the tool to move axially. A working implement is coupled to the distal end of the threaded shaft.

5 Claims, 13 Drawing Sheets

(51) Int. Cl.
*B23D 17/04* (2006.01)
*B26B 15/00* (2006.01)

(56) References Cited

U.S. PATENT DOCUMENTS

| | | | |
|---|---|---|---|
| 5,297,780 A | 3/1994 | Hickerson | |
| 5,520,064 A | 5/1996 | Hickerson et al. | |
| 7,044,017 B2 * | 5/2006 | Cornelius | F16H 25/2252 74/424.81 |
| 9,168,667 B2 * | 10/2015 | Zurcher | A01G 3/037 |
| 9,521,810 B2 * | 12/2016 | Zurcher | A01G 3/037 |
| 2005/0160856 A1 * | 7/2005 | Sugitani | F16H 25/2252 74/424.92 |
| 2014/0157522 A1 * | 6/2014 | Lorini | F16H 25/2252 30/228 |
| 2016/0039017 A1 * | 2/2016 | Lawlor | F16H 25/2252 30/228 |

\* cited by examiner

TOOL WITH LINEAR DRIVE MECHANISM

TECHNICAL FIELD

This invention relates to linear drive mechanisms, and more particularly to linear drive mechanism that are portable and compact.

BACKGROUND ART

Portable hand tools are commonly used by emergency personnel to bend, spread or cut metal pieces to free drivers and passengers from their vehicles after accidents. The working implements on these hand tools are actuated by a linear mechanism coupled to a hydraulic cylinder. The hydraulic cylinder is coupled to a gas or electricity powered hydraulic pump.

One drawback with power hand tools that use hydraulic pumps is the hydraulic pump's periodic inspection and maintenance requirements. Another drawback is the tool's housing is elongated to accommodate the hydraulic pump, the linear mechanism and the working implement.

What is needed is a portable hand tool with an electric, non-hydraulic linear drive mechanism coupled to a working implement.

DISCLOSURE OF THE INVENTION

It is an object of the present invention to provide a portable hand tool with a lightweight, compact linear drive mechanism that uses a roller screw coupled to the tool's working implement.

The linear drive mechanism includes a roller screw threaded shaft with an external nut and rollers mounted over an axially aligned threaded shaft longitudinally aligned inside the tool's elongated body. In one embodiment, the proximal end of the threaded shaft is coupled to a gearbox that is coupled to an electric motor that can be operated in both forward and reverse directions. The gearbox includes a plurality of gears configured to reduce the RPM output from the electric motor. In the first embodiment, the gearbox is also coupled to a frictional clutch configured to engage the inside surface of the roller screw shaft when rotated a specific amount. In a second embodiment, the frictional clutch is eliminated and replaced by a multiple stage gear box.

When the electric motor is activated, the frictional clutch or multiple stage gear box causes the threaded shaft to rotate. In the first embodiment, as the threaded shaft is rotated, the roller screw's nut body moves longitudinally inside the tool's elongated body. In the second embodiment, the nut body is fixed axially inside the tool's outer housing so as the nut body is rotated, the threaded shaft moves axially inside the tool's outer housing.

Mounted distally inside the elongated body and adjacent to the distal end of the roller nut is a tool implement coupler that attaches to a tool implement that extends from tool's distal end. The tool implement may include two pivoting cutting jaws, two pivoting spreader jaws, or a ram bar. A rechargeable battery s attached to the proximal end of the elongated housing to energize the electric motor.

In the second embodiment, the mechanical linear drive is a geared planetary roller screw that includes a torque tube connected to a roller screw's nut body. The planetary roller screw includes a fixed outer race, a rotating set of grooved rollers axially aligned inside the outer race, a cylindrical nut body located inside the set of grooved rollers, a plurality of threaded inner rollers axially aligned and inside the nut body, a threaded shaft axially aligned and inside the inner rollers, and a torque tube fixed to the nut body. The nut body operates as an inner race for the grooved inner rollers. The torque tube is connected at one end to the gear box coupled to an electric motor. When electric motor is activated, the torque tube is rotated which causes a threaded shaft in the tool to move axially inside the tool. A working implement is coupled to the distal end of the threaded shaft.

BEST MODE FOR CARRYING OUT THE INVENTION

Figure 1:
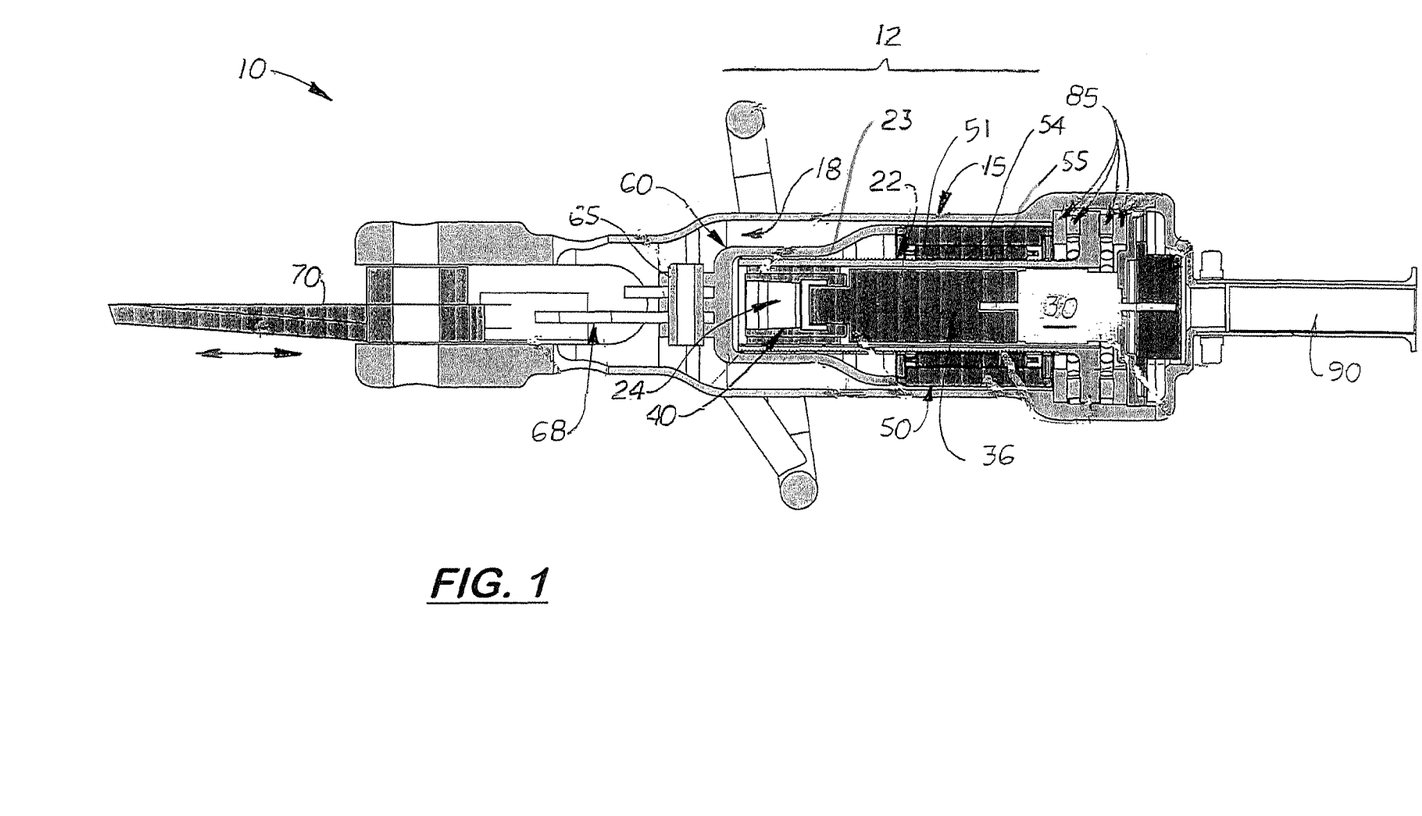
FIG. 1 is a sectional side elevational view of a first embodiment of a tool with two cutting jaws, a frictional clutch, and a linear drive mechanism.

A tool 10 with a lightweight linear drive mechanism 12 in the tool's elongated body 15 and designed to provide 70,000 to 120,000 lbs of force to the tool's working implement 70. FIG. 1 discloses a first embodiment of the tool 10 that includes a roller screw assembly shown and described in U.S. Pat. No. 7,044,017 and incorporated herein. The roller screw assembly includes a roller screw shaft 22 and a nut body 50 mounted over the outer surface of the roller screw shaft 22. Disposed inside the nut body 50 is a plurality of longitudinally aligned rollers 54 designed to remain in constant contact with formed helical threads 23 on the outer surface of the roller screw shaft 22 and with grooves 51 formed on the interior surface of the nut body 50 during operation. The rollers 54, however, can shift axially and re-positioned with respect to both the nut body 50 and the roller screw shaft 22 as the roller screw shaft 22 is rotated while remaining in rolling contact with the nut body 50.

The grooves 51 on the nut body 50 are helical over most of the inside surface of the nut body 50. Over a small region of the inside surface of the center bore, hereinafter referred to as the cross-over region, the grooves 51 extend radically outward and axially. Located inside the nut body 50 is a plurality of longitudinally aligned rollers 54. Formed over the outer surface of the rollers 54 are non-helical grooves 55 that mesh with a plurality of closed, partially helical grooves 51 on the nut body 50 and with the helical threads 23 on the roller screw shaft 22 that extends through the nut body 50. When the rollers 54 travel through the cross-over region, two compression rings on the opposite ends of the rollers 54 force the rollers 54 radially outward so they maintain engagement with the grooves 51 on the nut body 50.

Because the grooves 51 in the cross-over region extend axially, the rollers 54 are shifted axially regarding the nut body 50 and roller screw shaft 22 when centrally disposed in the cross-over region. As the rollers 54 leave the cross-over region, they are extended axially and returned to the original starting point of the grooves 51 on the nut body 50.

The grooves 55 on the rollers 54 are non-helical and designed to engage both the closed grooves 51 on the nut body 50 and on the helical threads 23 on the roller screw shaft 22. The diameters of the roller screw shaft 22, the nut body 50, and rollers 54 are sufficient in size so that when the grooves 55 on the rollers 54 engage the grooves 51 on the nut body 50 in the cross-over region, they progressively disengage from the helical threads 23 on the shaft 22 enabling the rollers 54 to move axially with respect to the nut body 50. As the rollers 54 leave the cross-over region, they travel axially and re-engage the helical threads 23 on the roller screw shaft 22. With each rotation of the roller screw shaft 22 inside the nut body 50, the rollers 54 are in constant rolling contact with the grooves 51 on the nut body 50.

The above described roller screw assembly 12 is longitudinally aligned inside the hollow cavity 18 formed in the hand tool's elongated body 15. The roller screw shaft 22 is coaxially aligned inside the cavity 18 and includes a longitudinally aligned cavity 24. Mounted inside the cavity 24 and adjacent to the proximal end of the roller screw shaft 22 is an electric motor 30. Mounted adjacent to the electric motor 30 and inside the cavity 24 is a gearbox 36. The gearbox 36 is coupled to the drive shaft on the electric motor 30 and configured to reduce the RPM output from the electric motor 30.

The opposite end of the gearbox 36 is coupled to a frictional clutch 40 also located inside the distal end of the cavity 24. When the electric motor 30 is activated, the gear box 36 causes the frictional clutch 40 to rotate that eventually engages the exposed section of the inside surface of the roller screw shaft 22 and causing the roller screw shaft 22 to rotate inside the nut body 50.

Longitudinally aligned and located distally inside the elongated body 15 is an elongated push cap 60. The push cap 60 includes a wide proximal section and a narrow front neck section. The distal end of the roller screw shaft 22 extends into the center bore formed in the push cap 60. When assembled, the end surface of the proximal section abuts the distal end surface of the nut body 50. When roller screw shaft 22 is rotated, the nut body 50 travels longitudinally inside the elongated body 15 in a fore or aft direction depending on the direction of rotation of the electric motor 30.

Mounted on the distal end of the push cap 60 is a pivot pin 65 coupled to toggle linkage 68. The toggle linkage 68 is connected to one or more cutter or spreader blades 70 used on the working implement.

The roller screw shaft 22 is held coaxially inside the elongated body 15 and the push cap 60 by bearings 85. The roller screw shaft 22 includes a perpendicular aligned base that fits inside the proximal wide end section of the elongated body 15. The electric motor 30 is held inside the proximal end of the roller screw shaft 22 by a transverse member that extends across the proximal end opening. The electric motor 30 includes a secondary shaft coupled to an electrical brake mounted on the proximal end of the elongated body 15.

A rechargeable battery 90 may be attached to the proximal end of the elongated body 15 to energize the electric motor 30.

FIGS. 2-10 show a second embodiment of the tool 200 with a lightweight linear drive mechanism that uses an electric motor assembly 205 coupled to a multiple stage gear box 220 used in place of the frictional clutch 40. Coupled to the gear box 220 is a geared planetary roller screw 250 that is used in place of the roller screw assembly described above. The geared planetary roller screw 250 is similar to the roller screw shown in U.S. Pat. No. 2,683,379 (Strandgren) which is now incorporated herein.

Figure 4:
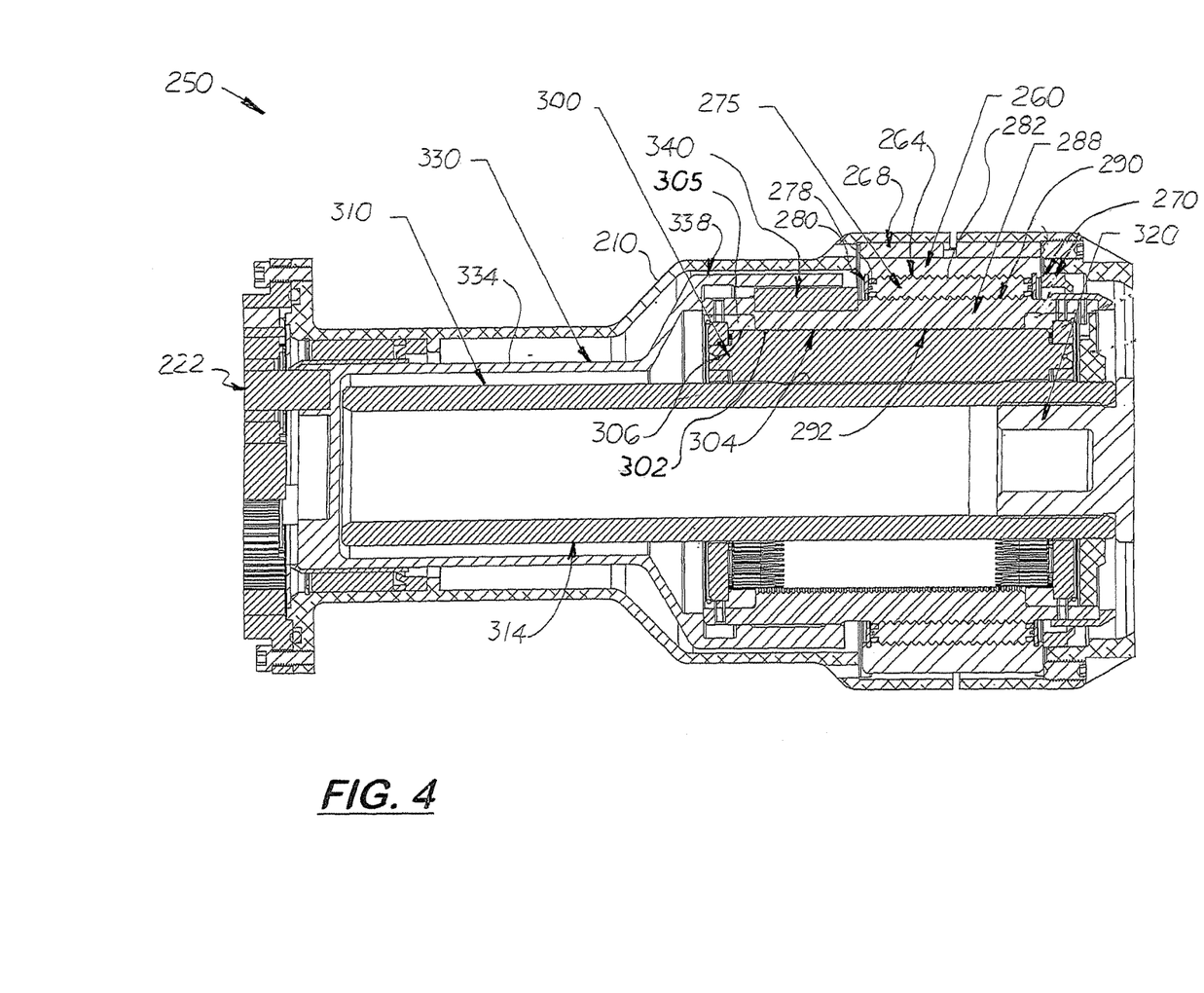
FIG. 4 is an enlarged, partial sectional side elevational view of the geared planetary roller screw located inside the tool shown in FIGS. 2 and 3.
Figure 5:
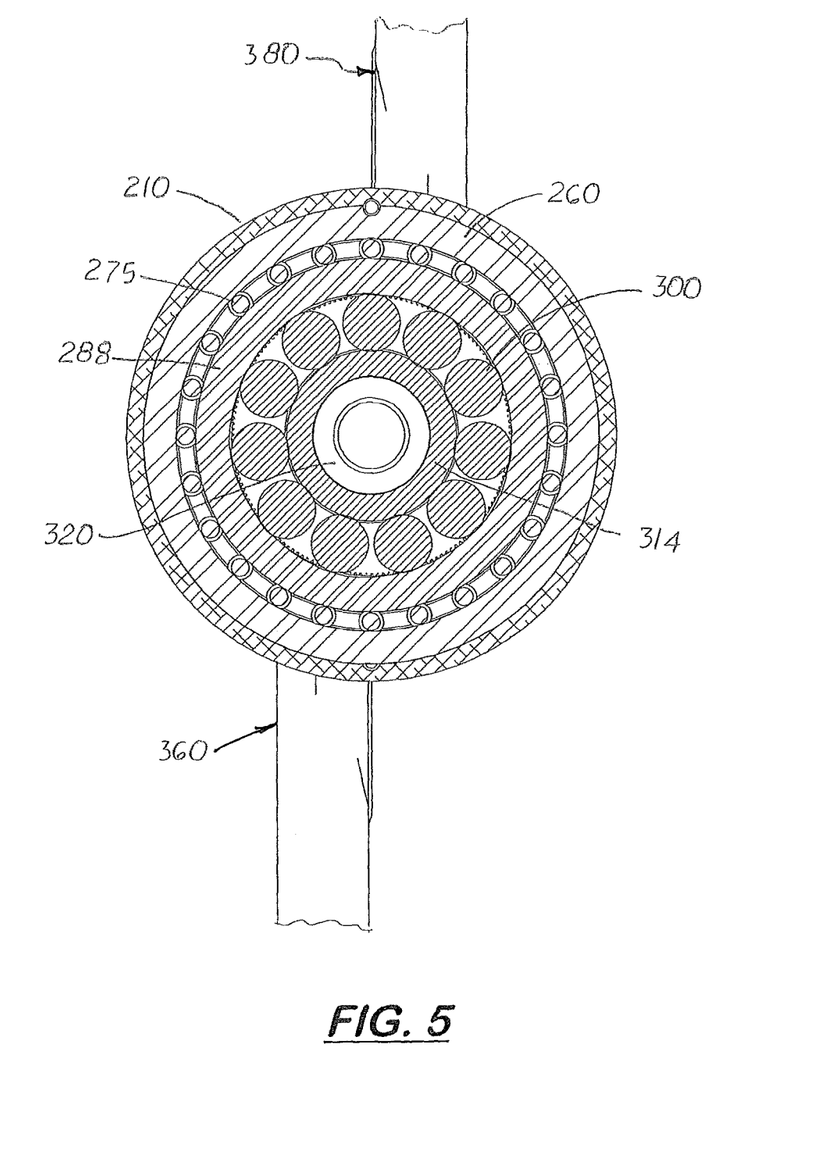
FIG. 5 is an end sectional view taken along line 5-5 in FIG. 3.
Figure 6:
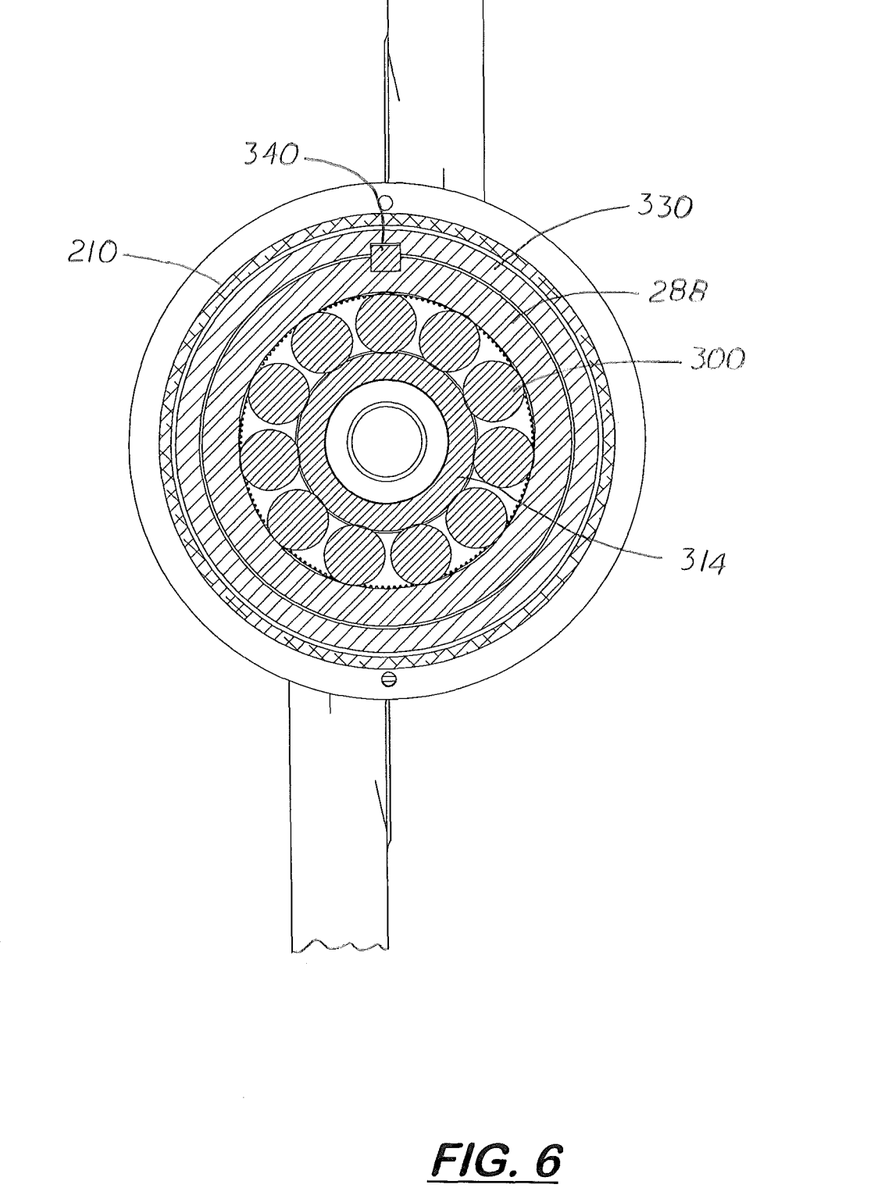
FIG. 6 is an end sectional view taken along line 6-6 in FIG. 3.
Figure 7:
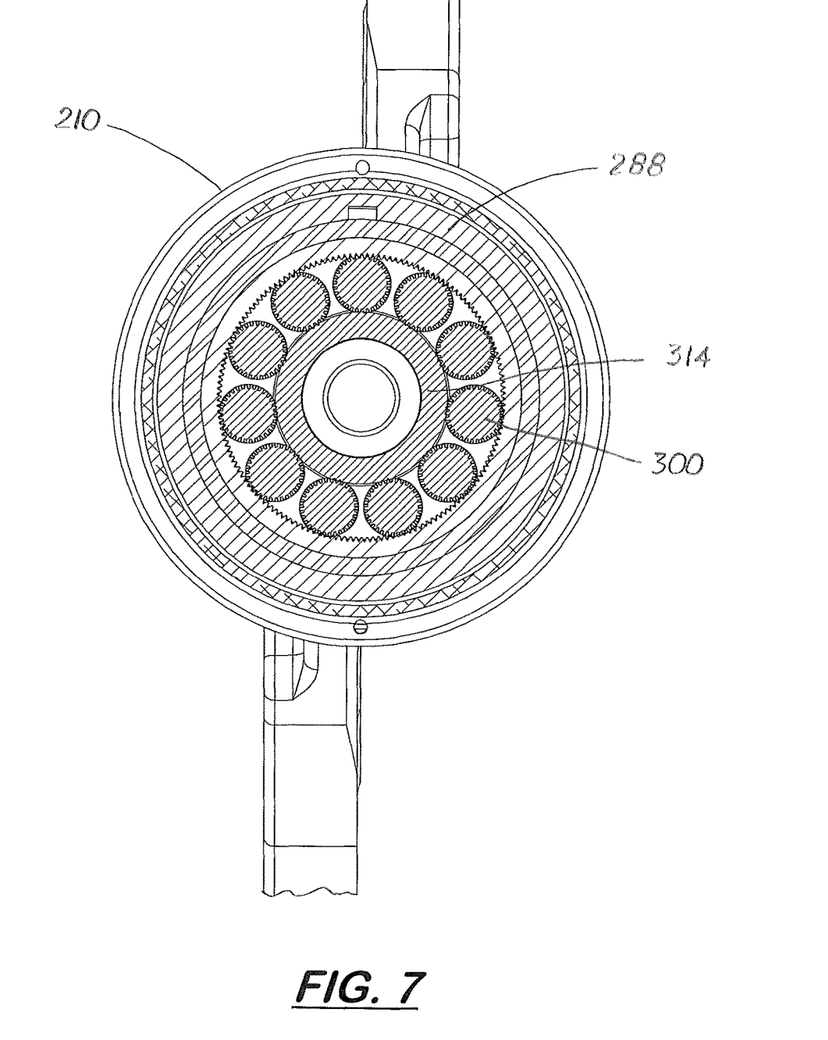
FIG. 7 is an end sectional view taken along line 7-7 in FIG. 3.
Figure 8:
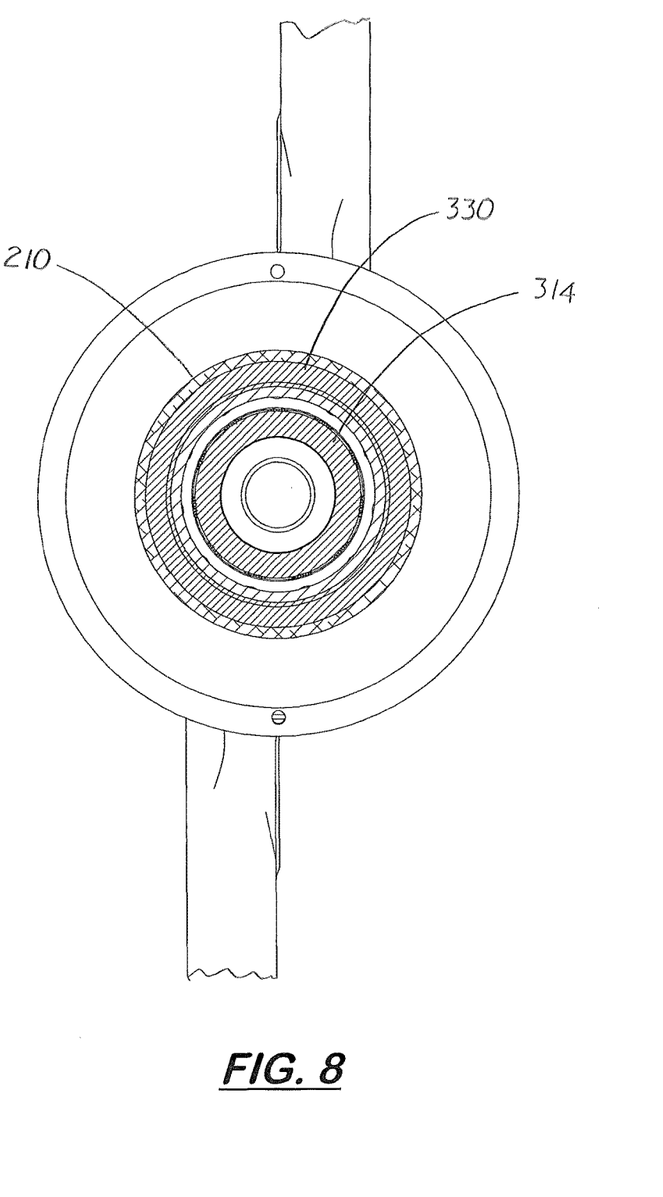
FIG. 8 is an end sectional view taken along line 8-8 in FIG. 3.
Figure 9:
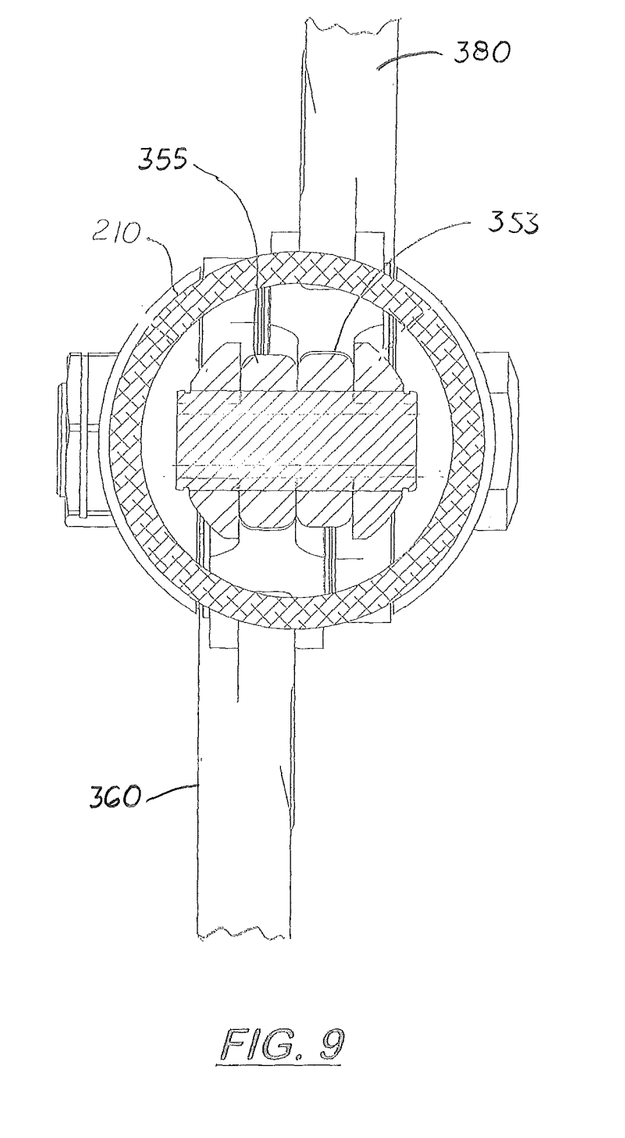
FIG. 9 is an end sectional view taken along line 9-9 in FIG. 3.
Figure 10:
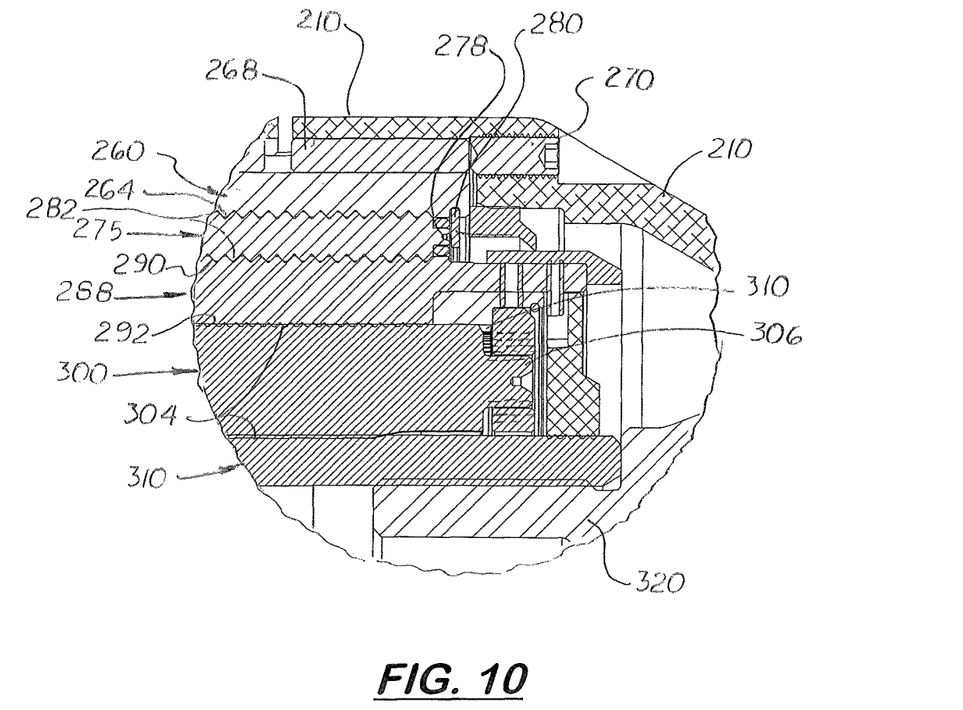
FIG. 10 is an exploded view of the dowel pin, the outer race, the grooved roller located inside the outer race, the snap ring, the nut body located inside the grooved roller, the inner threaded roller, ring gear, the wiper seal, and the threaded shaft.

As shown in FIG. 4, the geared planetary roller screw 250 includes a fixed cylindrical, fixed outer race 260 axially aligned inside the tool's outer housing 210. The outer race 260 includes a plurality of internal, non-helical grooves 264. A dowel pin 268 is inserted in between the outer housing 210 and the outer race 260 to hold the outer race 260 inside the tool 200. A set screw 270 is used to retain the dowel pin 268 in the outer housing 210.

Located adjacent inside the outer race 260 is a plurality of outer grooved rollers 275. Formed on each end of the outer grooved rollers 275 are axially aligned axles 278 that engage bores formed on two spacer rings 280 coaxially aligned inside the outer housing 210. Each grooved roller 275 includes a plurality of non-helical grooves 282 configured to mesh with the non-helical grooves 264 formed on the outer race 260. During operation, the set of grooved rollers 275 and the two spacer rings 280 rotate inside the outer housing 210.

Located adjacent and inside the grooved rollers 275 is a cylindrical nut body 288 configured to rotate inside the outer housing 210. The nut body 288 includes a plurality of external non-helical threads 290 that mesh with the non-helical grooves 282 on the grooved rollers 275. The nut body 288 acts as an inner race for the outer groove rollers 275. The nut body 288 also includes a plurality of internal helical threads 292. The non-helical threads 290 on the external surface of the nut body 288 allow the nut body 288 to rotated but prevent the nut body 288 from moving axially inside the outer housing 210.

Located adjacent and inside the nut body 288 is a plurality of axially aligned inner rollers 300. Each inner roller 300 includes external helical threads 304 that mesh with the internal helical threads 292 on the inside surface of the nut body 288. Each inner roller 300 includes at its opposite ends a set gear teeth 306 that engage two ring gears 305 aligned transversely inside the outer housing 210. Formed on the two ring gears 305 are a plurality of external teeth 306 that mesh with the gear teeth 302 on opposite ends of the inner rollers 300. During operation the inner rollers 300 individually rotate on their longitudinally axis and rotate around a threaded shaft 310 that extends coaxially and inside the outer housing 210.

The threaded shaft 310 includes a plurality of helical external threads 314 that extend substantially the entire length and mesh with the helical threads 304 on the inner rollers 300. In the embodiment shown herein, the threaded shaft 310 is approximately twice as long as the inner rollers 300. The threaded shaft 310 is hollow with a proximal end and a distal end. Attached to the distal end is a combination end cap/clevis 320.

Disposed inside the outer housing 210 is a torque tube 330 that includes a narrow cylindrical hollow neck 334 and a wide cylindrical body 338. The neck 334 is configured to surround the rear portion of the threaded shaft 310 that extends rearward from the inner rollers 300. The wide cylindrical body 338 is configured to extend outward and partially extend around the exterior surface of the nut body 288. Formed the inside surface of the wide cylindrical body 338 and the adjacent surface of the nut body 288 is keyway. A complementary key 340 is inserted into the two keyways to affix the torque tube 330 to the nut body 288. Formed on the proximal end of the torque tube 330 are one or more receiving bores that receive pegs 222 that extend longitudinally inward from the gear box 220.

During operation, the electric motor 205 is activated which causes the pegs 222 on the gear box 220 to rotate. The rotation of the pegs 222 on the gear box 220 causes the torque tube 330 to rotate which causes the nut body 288 to rotate. Because the grooved rollers 275 prevent the nut body 288 from moving longitudinally inside the outer housing 210, the inner rollers 300 engage the threads 304 on the threaded shaft 310 causing the threaded shaft 310 to move longitudinally inside the outer housing 210.

Figure 2:
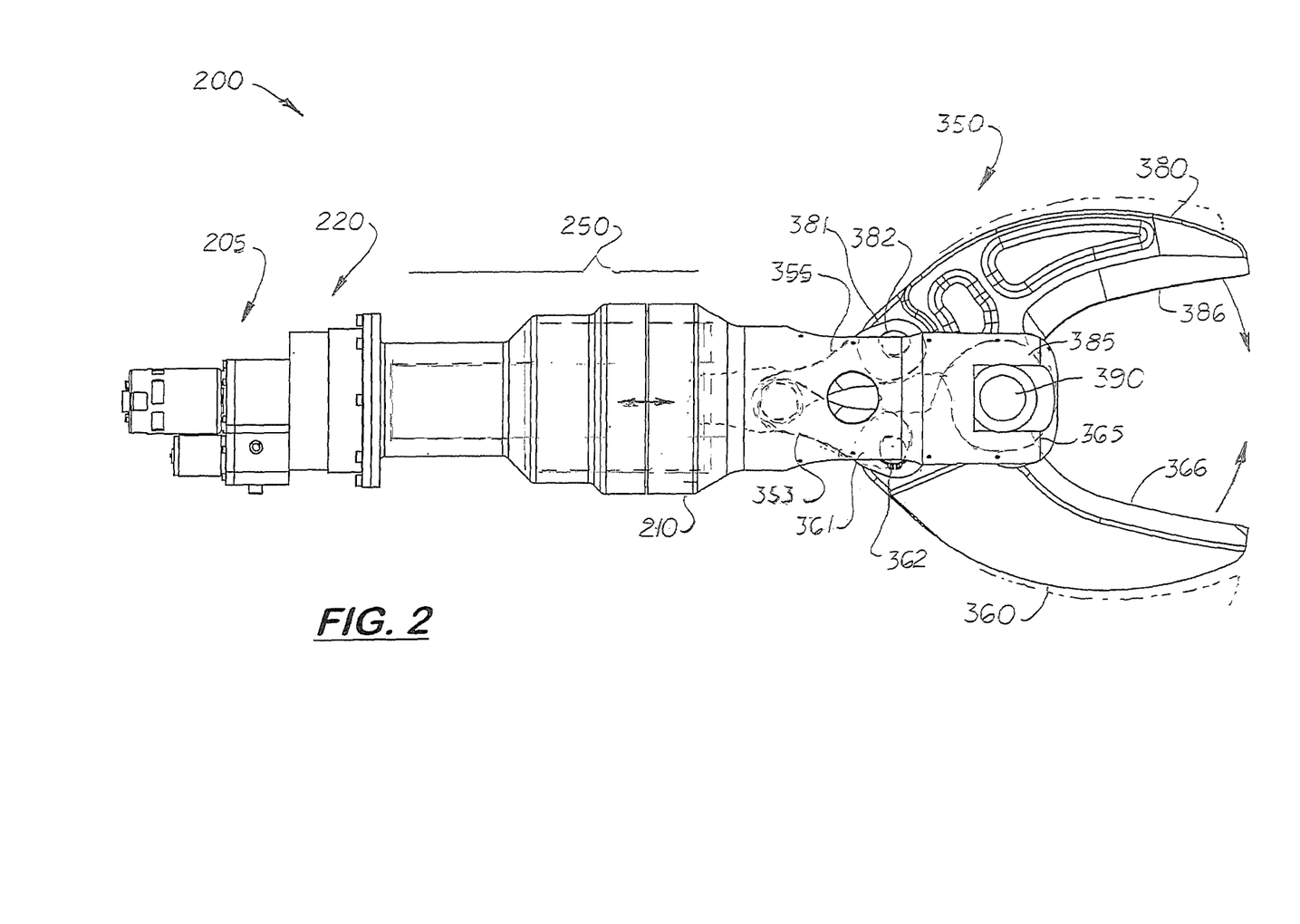
FIG. 2 is a side elevational view of a second embodiment of a tool with two cutting jaws and a geared planetary roller screw used as a linear drive mechanism.
Figure 3:
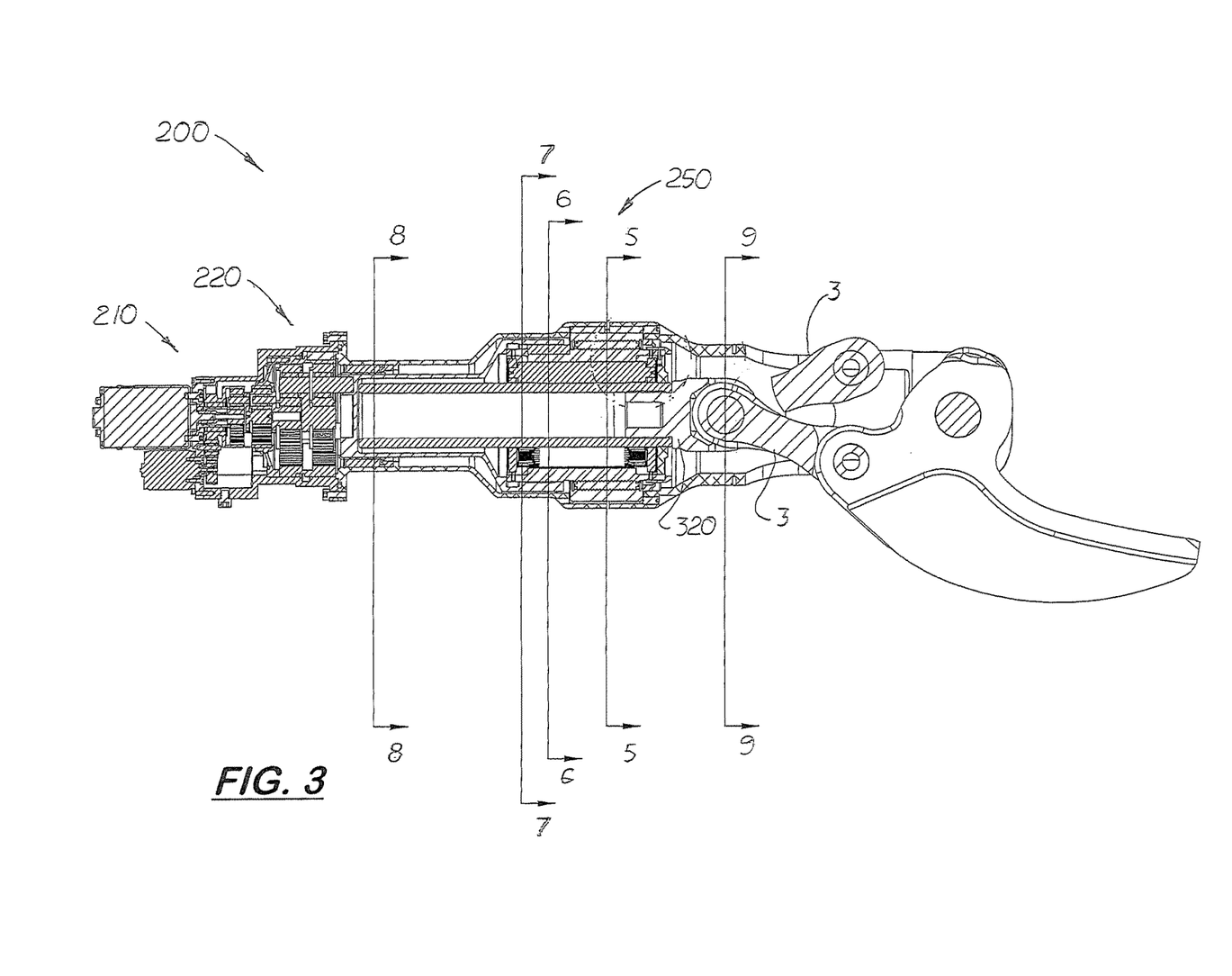
FIG. 3 is a sectional side elevational view of the tool shown in FIG. 2.

FIGS. 2 and 3 show the tool 200 attached to a tool implement 350 with two cutting jaws 360, 380 extending from the distal end of the outer housing 210. The two cutting jaws 360, 380 include cutting blade edges 366, 386 and middle sections 365, 385, respectively, rotatingly coupled together by a rigid front pin 390. The rear section 361, 381 of each jaws 360, 380, respectively, is pivotally connected to a linkage arm 353, 355, respectively. The rear end of each linkage arm 353, 355 is connected to a combination end cap/clevis 320 (shown in FIG. 4) which is connected to the end cap 320. The front end of each linkage arm 353, 355 is connected to a cutting jaws 360, 380 via pins 362, 382, respectively. During use, the threaded shaft 310 moves axially inside the outer housing 210 causing the rear sections 361, 381 of the two jaws 360, 380, respectively, to move towards or away from the front pin 390 and thereby opening and closing the jaws 360, 380.

Figure 11:
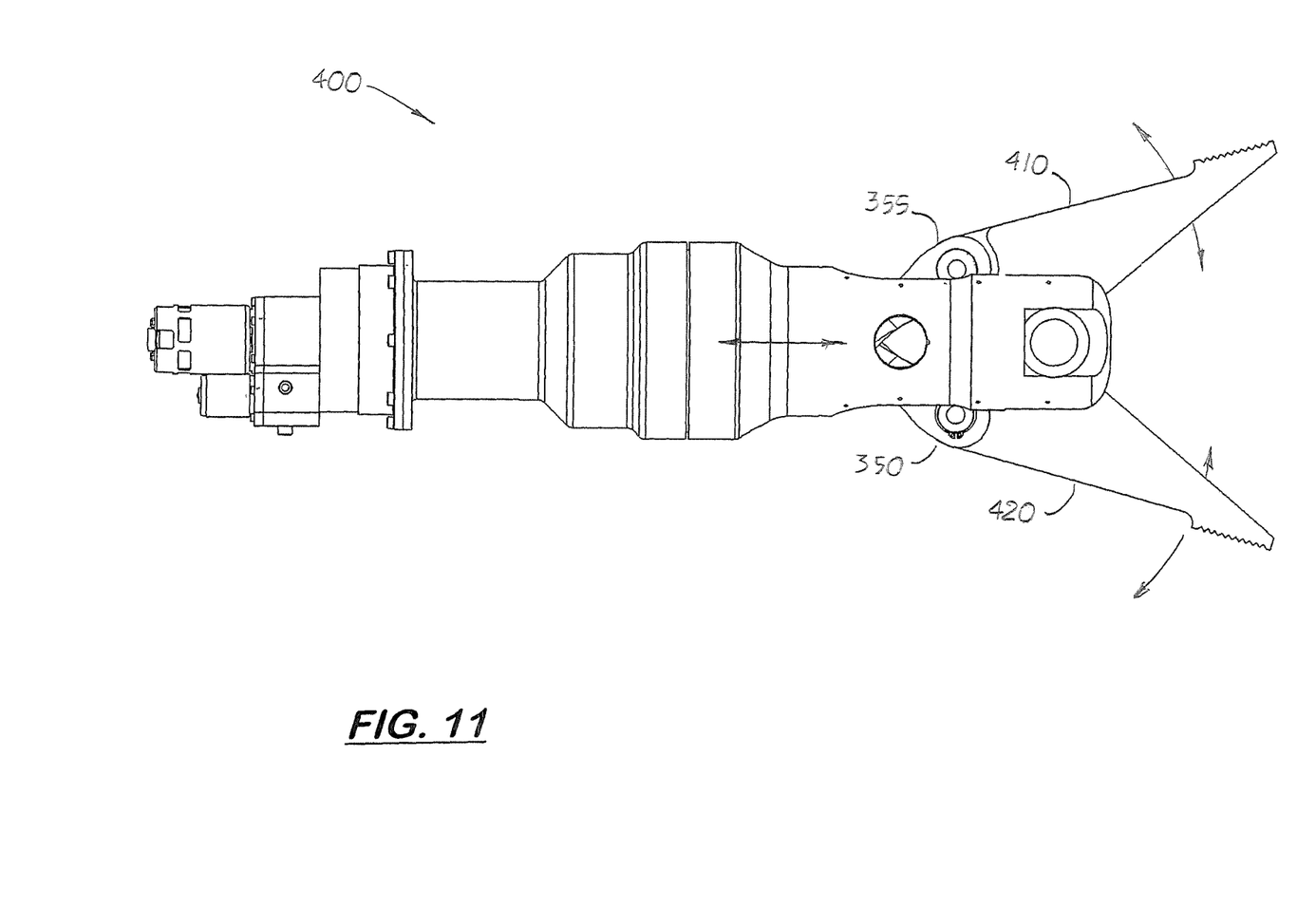
FIG. 11 is a side elevational view of a tool with two spreader jaws.
Figure 12:
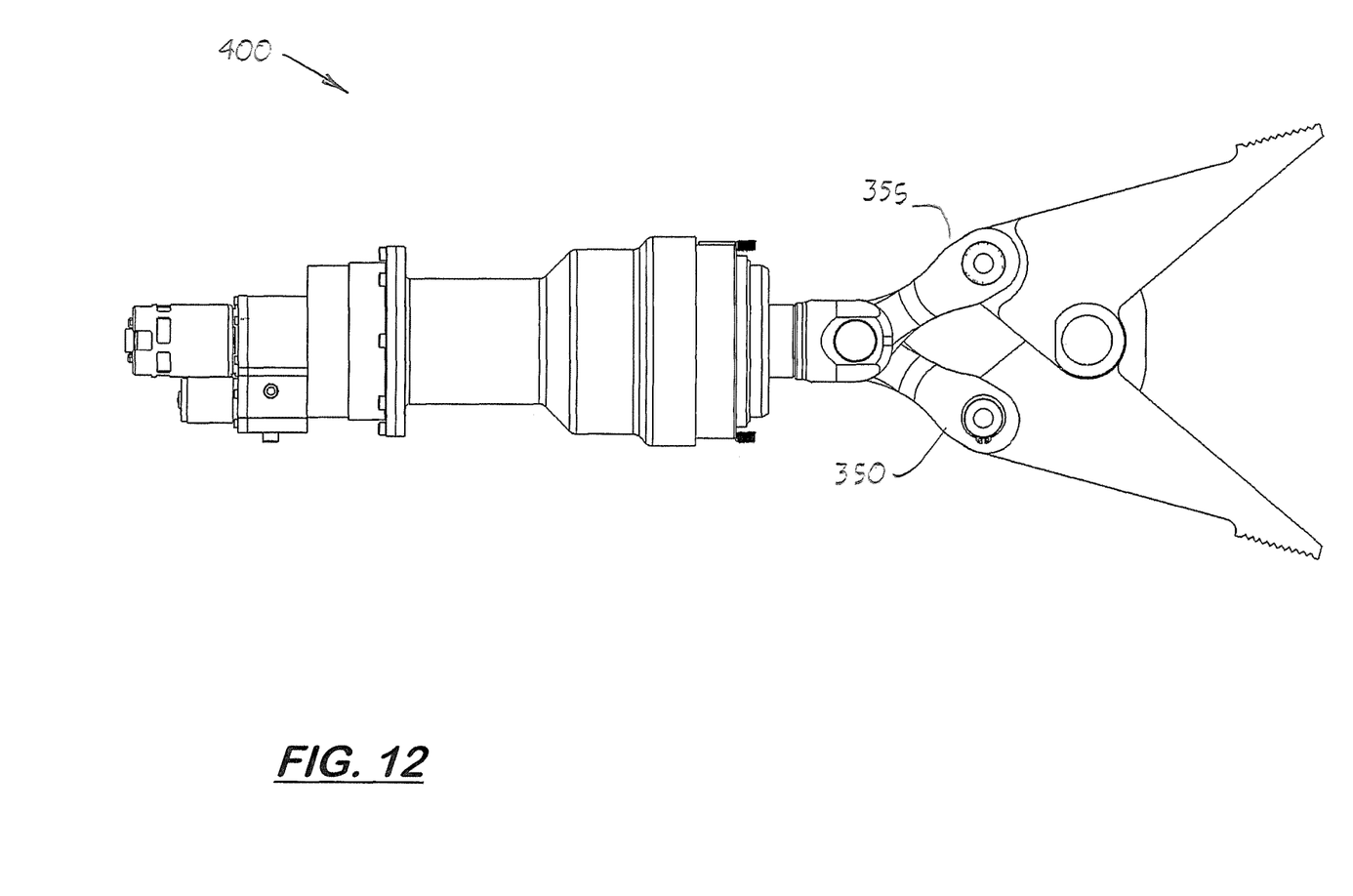
FIG. 12 is a side elevation view of the tool shown in FIG. 11 with the front section of the outer housing removed to show the linkage arms coupled to the spreader arms.

FIGS. 11 and 12 are side elevational views of a tool implement 400 with two spreader jaws 410, 420 that extend from the distal end of the outer tool housing 212. The spreader jaws 410, 420 are connected to linkage arms 353, 355 and operate in a manner that enable the spreader arms 410, 420 to open and close.

Figure 13:
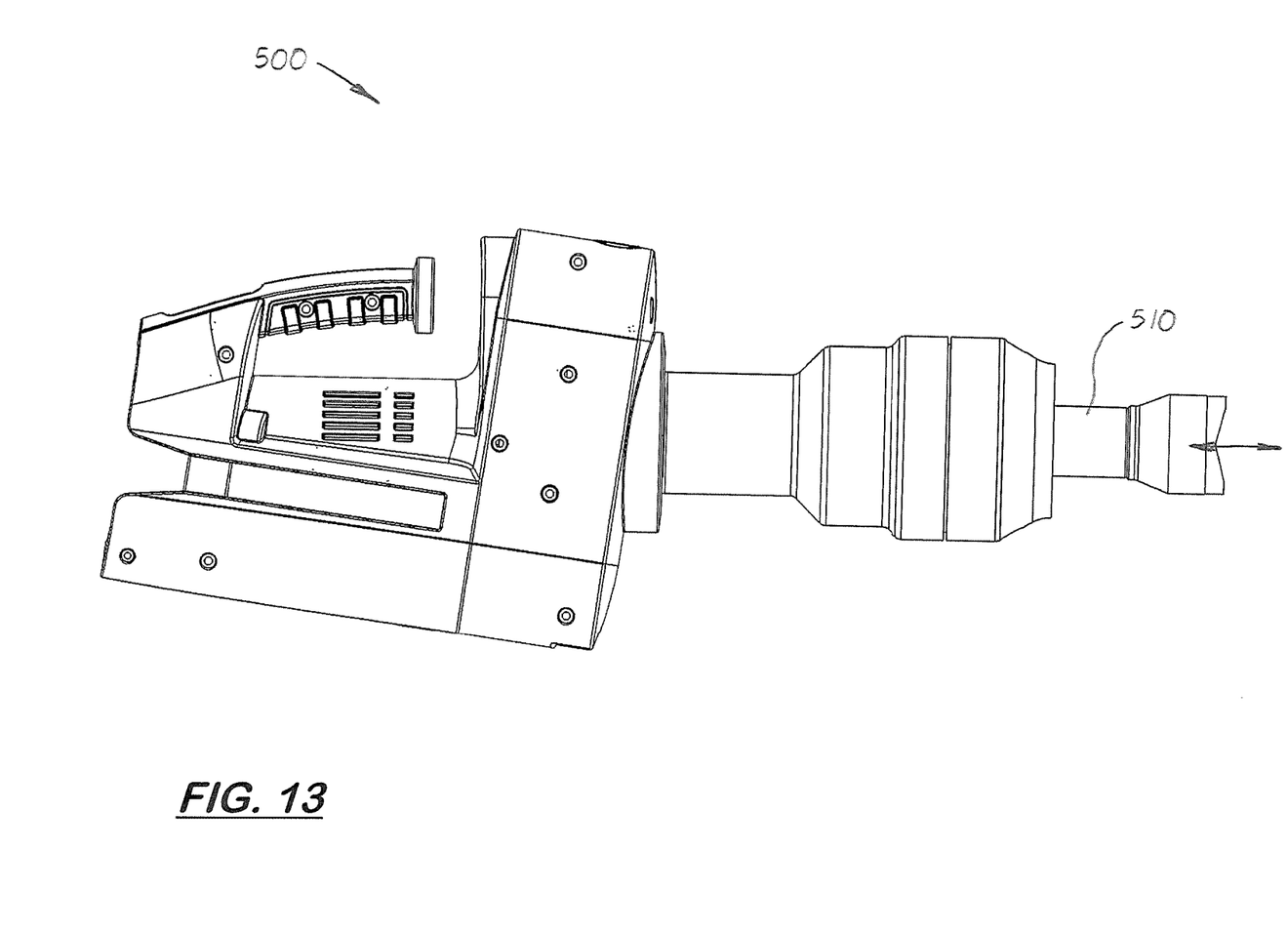
FIG. 13 is a side elevational view of a tool with a ram bar extending longitudinally from the front section.

FIG. 13 is a side elevational view of a tool implement 500 with a ram bar 510 extending longitudinally from the distal end of the tool housing. The ram bar 510 is connected directly to the distal end of the end cap or to the threaded shaft.

INDUSTRIAL APPLICABILITY

This invention has application in the portable hand tool and emergency equipment industries, and more particularly in such industries that need tools and equipment to covert rotation movement from an electric motor to a linear activated tool implement.

We claim:

1. A tool with a linear actuated working implement, comprising,
 a. an outer housing with a front end;
 b. a geared planetary roller screw disposed inside said outer housing, said roller screw includes:
  a fixed outer race axially aligned inside said outer housing, said outer race includes a plurality of internal non-helical grooves;
  a plurality of axially aligned grooved rollers radially aligned over the inside surface of said outer race and rotated as a set around said outer race, each said grooved roller includes external non-helical grooves that mesh with said non-helical grooves on said outer race;
  a cylindrical nut body axially aligned with and located inside said grooved rollers, said nut body includes a plurality of external non-helical threads that mesh with said non-helical grooves on said grooved rollers, said nut body includes a plurality of internal helical threads, said nut body configured to rotate inside said outer housing and not move longitudinally inside said outer housing;
  a plurality of inner rollers axially aligned and located inside said nut body, each said inner roller includes external helical threads that mesh with said internal helical threads on said nut body, each said inner roller includes a set gear teeth located at each end that engage two ring gears aligned transversely inside said outer housing with a plurality of teeth that mesh with said gear teeth on said inner rollers;
  a threaded shaft axially aligned with said outer race, said threaded shaft includes a plurality of helical external threads that mesh with said helical threads on said inner rollers, said threaded shaft includes a proximal end and a distal end;
  a torque tube axially aligned with said outer race, said torque tube includes a narrow neck coaxially aligned around said proximal end of said threaded shaft and a wide body that at least partially extends around and coupled to said nut body, whereby when said torque tube is rotated, said nut body rotates inside said grooved rollers causing said grooved rollers to individually rotate around said threaded shaft causing said threaded shaft to move axially with respect to said nut body;
 c. an electric motor;
 d. a gearbox disposed between said torque tube and said electric motor and configured to adjust the RPM output from the electric motor;
 e. a tool implement linkage coupled to said distal end of said threaded shaft;
 f. a linear activated tool implement coupled to said tool implement linkage extending from said front end of said outer housing; and,
 g. an electricity source connected to said electric motor.

2. The tool, as recited in claim 1, wherein said tool implement is a pair of cutting implements extending from said outer housing, said cutting implements coupled to a toggle linkage, each said cutting implement includes a forward extending blade with a cutting edge configured to cut through material placed transversely in between said cutting implements when pressed together with sufficient longitudinal force created by said roller screw and said electric motor.

3. The tool, as recited in claim 1, wherein said torque tube and said nut body are locked together with a key inserted into a keyway formed between said torque tube and said nut body.

4. The tool, as recited in claim 1 where said tool implement is a pair of cutting jaws that open and close when said threaded shaft moves axially.

5. The tool, as recited in claim 1 where said tool implement is a pair of spreader jaws that open and close when said threaded shaft moves axially.

* * * * *